United States Patent [19]

Sutcliffe

[11] 4,000,766
[45] Jan. 4, 1977

[54] LATHE DUPLICATOR
[76] Inventor: Brian L. Sutcliffe, 800 E. Center, No. 11, Provo, Utah 84601
[22] Filed: Oct. 10, 1975
[21] Appl. No.: 621,388
[52] U.S. Cl. .......... 144/144 R; 51/101 R; 90/13.2; 82/14 R; 142/37; 144/137
[51] Int. Cl.² .......... B23C 1/18
[58] Field of Search ........ 144/144 R, 144 S, 145 R, 144/134, 137, 2 R; 51/101; 90/13 R, 13.1, 13.2; 82/14; 142/3, 5, 20, 36, 37, 38, 39, 40, 41

[56] References Cited
UNITED STATES PATENTS 1,859,474  5/1932  Shawver .......... 142/38 X
2,793,569  5/1957  Tanner et al. .......... 144/145 R X

FOREIGN PATENTS OR APPLICATIONS 47,318  5/1933  Denmark .......... 142/37
85,761  7/1920  Switzerland .......... 142/37

Primary Examiner—Leonidas Vlachos
Assistant Examiner—W. D. Bray
Attorney, Agent, or Firm—Trask & Britt

[57] ABSTRACT

A lathe duplicator is constructed by mounting a conventional router on one arm of a member mounted to pivot on a guide rail. A second arm of the pivoting member is adapted to guide on a template to control the position of the router bit with respect to a revolving work stock. The router bit is oriented to rotate approximately normal the axis of rotation of the work stock. By rotating the template at the same rate as the work stock, complex surfaces, for example, gun stocks, can be duplicated. The template may be reversed in its direction of rotation to produce reverse surfaces on the work stock. The device is capable of producing spirals and other complex surface configurations.

10 Claims, 10 Drawing Figures

LATHE DUPLICATOR

BACKGROUND OF THE INVENTION

1. Field

This invention pertains to wood working tools, specifically duplicators, and provides an apparatus whereby an ordinary wood router may be adapted to function as a lathe duplicator.

2. State of the Art

Machinery of various types are known for reproducing complex shapes and surface configurations. Such configurations are commonly referred to as "gun stocks", because gun stocks are representative of the type. For industrial applications, specialized machines have evolved for reproducing a particular desired shape in large quantity. Such machines are elaborate and much more expensive than could be afforded by a small craftsman or hobbyist. Moreover, most of the machines known within the art have limited capabilities, because they are intended for a specific function. Representative of the existing art are machines such as those illustrated by U.S. Pat. Nos. 3,512,561; 3,635,265; 1,425,563; 1,345,859; 1,859,474; and 474,995.

The March, 1975 issue of Mechanics Illustrated describes an apparatus adapted to mount a router so that it can be used in place of a wood lathe. In essence, that apparatus provides correlated movements of the router and a work piece to provide right or left-hand spirals, reduce square stock to a cylinder or to produce desired surface configurations by tracing a template, although it apparently cannot duplicate directly from an original to produce a duplicate of the same size as the original. Coordination of the router with the work piece is accomplished by a system of cables, pulleys and springs, although it is capable of manual movement if desired.

SUMMARY OF THE INVENTION

The present invention provides a system and apparatus for adapting an ordinary wood router for use as a duplicator of either original or reverse surface configurations. It may be embodied either as an attachment for a common wood lathe, or as a self-contained duplicating machine. In either event, it functions to duplicate original parts to exact dimensions from either an original part or optionally (if concentric parts are being duplicated) a flat template. Although it is most useful for reproducing parts to exact scale, it may be set up to either reduce or enlarge from a template or original part. Additional features include a quick release method and apparatus for chucking a work piece and/or original into position, and coordination mechanism for adapting the basic system and apparatus to produce spiral cuts.

Whether the duplicator of this invention is embodied as a self-contained machine or as an adaption device for an existing lathe, it may be viewed as including a first chucking means with the head stock and tail stock arranged to hold a work piece to rotate around an axis joining the head stock and tail stock in the fashion common to wood lathes, and a second chucking means arranged to mount a template (which is conveniently an original part it is wished to duplicate or reverse) representing a surface configuration desired to be applied to the work piece. The template is chucked so that it contains a reference axis parallel the axis of rotation of the work piece. A guide rail is mounted parallel the axis of rotation, and extends substantially the entire length of the work piece which is held within the first chucking means.

A structural member is mounted on the guide rail to slide longitudinally along substantially its entire length and to pivot around the axis of the guide rail or an axis parallel and fixed with respect to the guide rail. This member, which may be called a "tool holder," includes a first arm, which carries a "sensing probe." The sensing probe is located to contact the template surface when the tool holder is caused to pivot sufficiently on the guide rail. In this fashion, the degree of pivot of the tool holder is limited in accordance with the configuration of the template's surface. A second arm of the tool holder carries a common router with the router bit arranged to spin around an axis approximately normal the axis of rotation of the work piece. The bit extends from the second arm in a direction opposite the direction that the sensing probe extends from the first arm, and is located to contact the work piece at a site correlated with (1) the longitudinal location of the tool holder along the guide rail and (2) the degree of pivot of the member. The bit will thus route a surface configuration on the work piece which is precisely correlated with the surface configuration represented by the template. Means are provided for rotating the work piece around its axis of rotation while the router bit is caused to spin so that as the router is moved longitudinally across the work piece the router bit shapes the surface of the work piece in conformity with the surface of the template.

The apparatus of this invention provides for various modifications through set-up to adapt the device to various functions. For example, means are provided to rotate the template at the same speed of rotation as the work piece but either in the same direction or in the reverse direction to produce, respectively, either duplicates or reversed duplicates of the pattern. An important aspect of this invention is that the piece being duplicated need not be symmetrical about an axis as is the case with many duplicators. Thus, the claimed device can, without further modification, produce complex shapes, such as gun stocks, either as exact duplicates or as mirror image duplicates. For most operations, the tool holder carrying the router may be slid manually along the axis of the guide rail. In some instances, for example for the production of spiral cuts, it is desired to correlate the longitudinal movement of the router bit with respect to the rotation of the work piece. For those purposes, the apparatus of this invention may be provided with means, such as a worm drive, integral with the guide rail to move the router bit along the work piece at a preselected rate with respect to the speed of rotation of the work piece.

BRIEF DESCRIPTION OF THE DRAWINGS

In the drawings, which illustrate the best mode presently contemplated for carrying out the invention.

DESCRIPTION OF THE ILLUSTRATED EMBODIMENT

Figure 1:
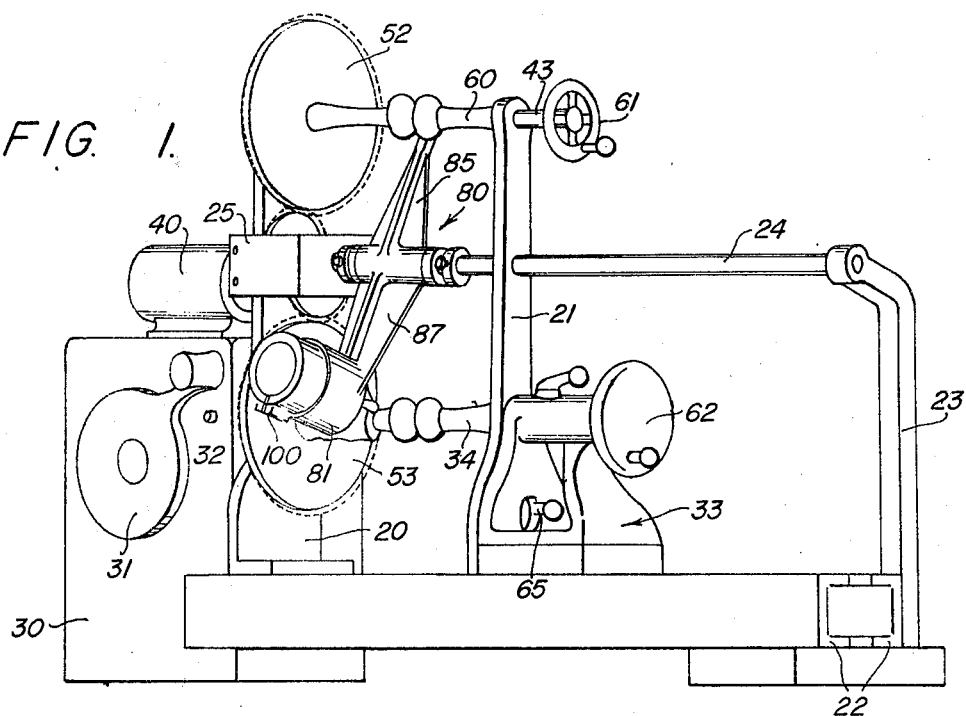
FIG. 1 is a view in perspective of the duplicator of this invention adapted to a conventional wood lathe.
Figure 2:
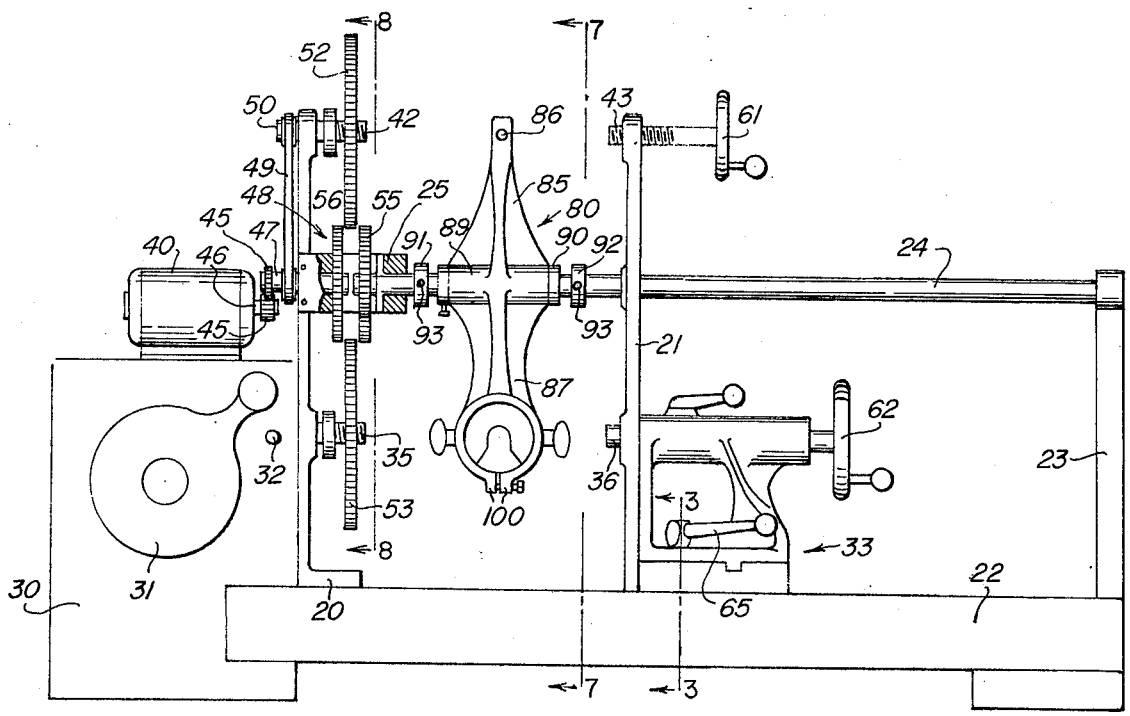
FIG. 2 is a similar view in side elevation with the original and work piece illustrated by FIG. 1 removed.

Referring specifically to FIGS. 1 and 2, the invention comprises a head stock stand 20 and a tail stock stand 21 upstanding from a set of more or less conventional ways 22. An end support 23 upstanding from one end of the ways 22 supports one end of a carriage bar 24. The other end of the carriage bar 24 is supported from the head stock 20 by suitable connecting structure 25 as illustrated.

As illustrated, the duplicator of this invention is adapted to a conventional lathe with a conventional head stock 30, speed change lever 31, spindle lock 32 and tail stock assembly 33. Thus, a work piece 34 can be mounted between the head stock spindle 35 and tail stock center 36 in conventional fashion. Although it is possible to drive the head stock spindle and the other mechanism of this invention with the drive system of the lathe, it is preferred to provide an auxiliary motor 40 for this purpose, as illustrated by FIG. 2. The drive system and motor of the lathe may thus be bypassed when the auxiliary equipment of this invention is in use.

Also supported from the head stock stand 20 is a duplicate spindle 42, while a corresponding duplicate center 43 is supported by the tail stock stand 21. In practice, an original part which it is intended to duplicate (or a template in some other form) is mounted between the duplicate spindle 42 and duplicate center 43. The spindles 35 and 42 are turned synchronously in either the same or opposite directions by the motor 40 through any suitable pulley, chain or equivalent driving mechanism, such as the gearing arrangement illustrated.

As shown, a pinion gear 45 at the distal end of the motor shaft 46 drives a corresponding gear 45' mounted on an end of a shaft 47 journaled through the head stock stand to drive a set of transmission gears designated generally 48. In some embodiments, the shaft 47 constitutes a lead screw which extends entirely through the carriage bar 24 as will be more fully explained hereinafter. In any event, operation of the transmission 48 (or comparable belt drive system) is similar.

Figure 8:
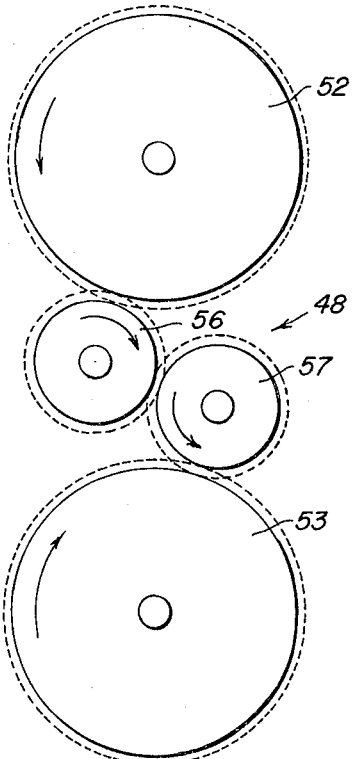
FIGS. 8 and 9 are fragmentary cross-sectional views taken along the reference line 8—8 of FIG. 2 viewed in the direction of the arrows to show the drive mechanism in the reverse and duplicating modes, respectively.
Figure 9:
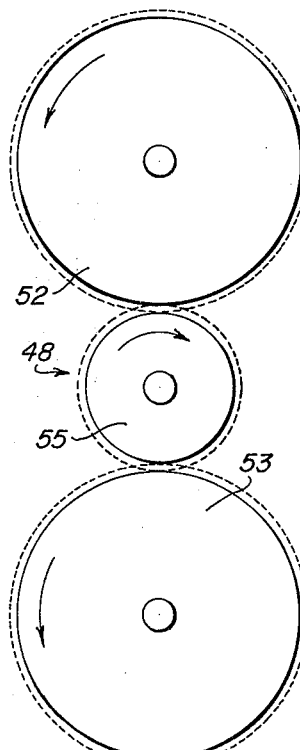

Assuming that the transmission is driven by the motor 40, as illustrated by FIG. 2, rotation of geared shaft 47 is transmitted through a belt drive 49 to a pulley 50 mounted to the end of the duplicate spindle 42, thereby turning the spindle and the attached driven gear 52. Power is transmitted from the driven gear 52 through a transmission 48 to a second gear 53 carried by the head stock spindle 35. The transmission comprises two choices of gear engagement between the driven gear 52 and the transmitted gear 53. FIG. 8 shows the arrangement when reverse rotation is desired and FIG. 9 shows the selection for duplicate rotation. As illustrated by FIG. 2, the gears 52 and 53 are disconnected (neutral mode) so that the work piece 53 is stationery even though the motor 40 may be turning. With the gear 55 moved to engage gears 52 and 53 (FIG. 9), gear 53 is caused to turn in precisely the same direction and at the same rate as gear 52 is driven by the motor 40. With the gear pair 56, 57 moved to engage the gears 52 and 53, respectively (FIG. 8), the gear 53 is caused to rotate in the opposite direction but at the same rate of speed as gear 52 is driven by the motor 40.

Positioning of the tail stock stand 21 may be accomplished by moving the tail stock assembly 33 in conventional fashion to advance or retreat the stand across the ways 22. Gross adjustments are accomplished in this fashion while minor adjustment (to clamp the work piece 34 and template 60, FIG. 1, into position) is accomplished by turning the wheels 61 and 62 associated with the centers 43 and 36, respectively.

Figure 3:
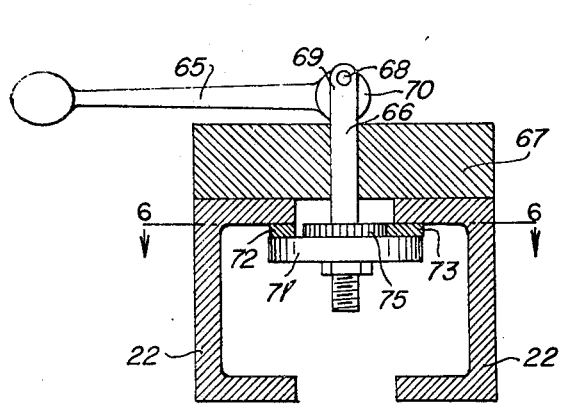
FIGS. 3 through 5 are fragmentary cross-sectional views taken along the reference line 3—3 of FIG. 2 viewed in the direction of the arrows to show the adjustment mechanism of the tail stock assembly in three different modes, respectively.

FIGS. 3 through 6 illustrate a particularly preferred tail stock adjustment mechanism which accomplishes repositioning of the tail stock stand in minimum time with a minimum of effort. The handle 65 is pivoted on one end of a shaft 66 extending through a bearing plate 67 which rests atop the ways 22. The pivotal connection between the shaft 65 and 66 comprises a pin 68 through a bifurcated end portion of the shaft 66 to connect to a circular segment 70 of the lever 65. A cam action is effected between the lever end 70 and the bearing plate 67 when the lever is depressed. Thus, with the lever fully depressed, as is shown in FIG. 3, a pressure disk 72 is brought firmly into engagement against spacer bars 73, 74 mounted within the ways 22 as shown. In this position the tail stock assembly 33 is tightly clamped to the ways and cannot be moved.

Figure 4:
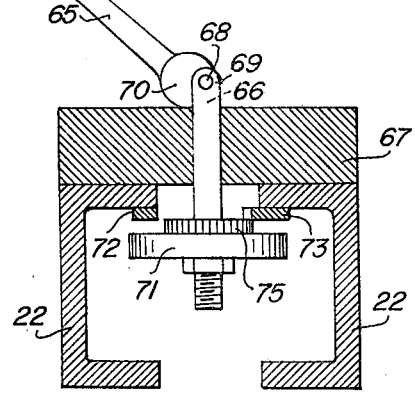
Figure 5:
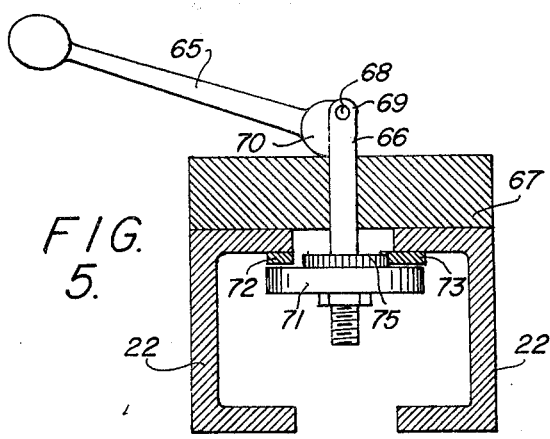
Figure 6:
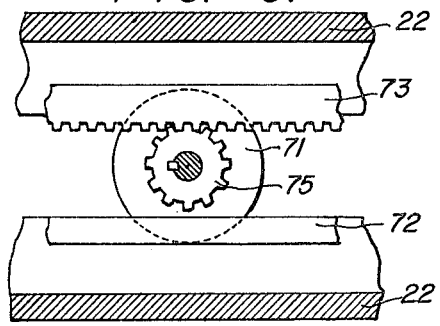
FIG. 6 is a fragmentary view in cross-section taken along the reference line 6—6 of FIG. 3 viewed in the direction of the arrows.

FIG. 4 illustrates the lever 65 raised to completely disengage the pressure disk 71 from the spacers 72 and 73. A pinion gear 75 carried atop the pressure disk 71 also clears the spacers 72 and 73 so that the tail stock may be readily slid along the ways 22 without interference. Thus, in this position, the tail stock may be readily moved across the entire length of the ways by hand. As best seen from FIG. 6, the spacer bar 73 is provided with teeth so that this spacer 73 in cooperation with the pinion gear 75 forms a rack and pinion arrangement which facilitates minor adjustments in the fashion best illustrated by FIG. 5. That is, when the lever handle 65 is partially raised, the pinion gear 75 remains in engagement with the rack spacer 73 although the pressure disk 71 is disengaged from the spacers 72, 73. Thus, movement of the handle 65 to cause the shaft 66 to rotate selectively in either the clockwise or counterclockwise direction causes similar rotation of the pinion in engagement with the rack 73 to either advance or retract the tail stock assembly and thereby the tail stock stand 21 across the ways 22. Thus, minor adjustments in position can be effected positively and conveniently without complete disengagement of the tail stock from the ways. Such adjustment is particularly advantageous from the standpoint of avoiding undesirable slippage of the tail stock while mounting a template or work piece.

Figure 10:
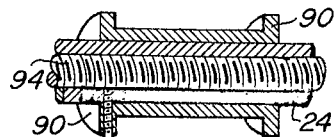
FIG. 10 is a fragmentary perspective view of a carriage assembly adapted to generate spiral cuts.
Figure 7:
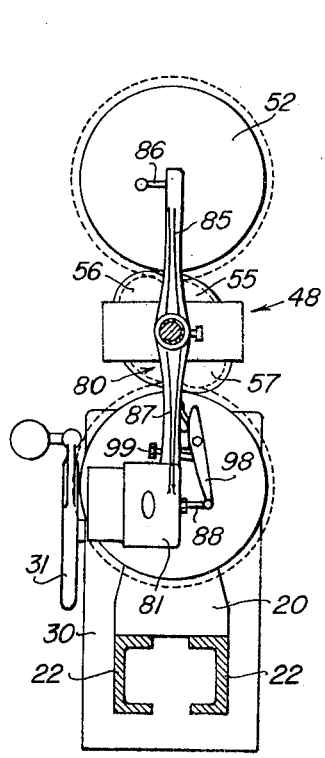
FIG. 7 is a view in cross-section taken along the reference line 7—7 of FIG. 2 and viewed in the direction of the arrows.

Slideably and pivotally mounted to the carriage bar 24 is a special carriage assembly 80 (tool holder) adapted to receive a conventional router motor 81 as shown in FIGS. 1 and 7. The carriage assembly comprises a first arm 85 which carries a sensing probe 86 intended to contact a template surface mounted between the chucking means comprised of the duplicate spindle 42 and duplicate center 43; and a second arm 87 which carries the router 81 with its router bit 88 extending in a direction opposite that of the sensing probe 86. It is desirable that the probe 86 be configurated exactly identical to the bit 88. In the form illustrated by FIG. 2, the carriage assembly is structured so that the arms 85, 87 merge in a central sleeve 89 which pivots around a carriage pivot 90. The carriage pivot 90 is mounted to slide longitudinally along the guide rail 24 between stop collets 91, 92. These collets are manually set in conventional fashion with set screws 93. As best illustrated by FIG. 10, the carriage pivot 90 may be moved manually across the carriage rail 24, or it may be driven by a lead screw 94 turning within the rail 24 at a selected rate. The pitch of the threaded lead screw 94 and its speed of rotation are selected depending upon the surface configurations desired. When it is desired to drive the carriage assembly with the lead screw 94, the index pin 95 is brought into engagement with the lead screw threads. When operated in this mode, it is possible to generate spiral grooves or screw threads.

Other components of the carriage assembly include a depth limiting adjustment mechanism, comprised of a spring biased gauge 98, an adjusting screw 99, and a clamp ring and tightening nut 100 to secure the router in place.

In operation, to produce an exact duplicate of an original part, a work piece 34 is chucked between the head stock spindle 35 and tail stock center 36, and the original part 60 is chucked between the duplicate spindle 42 and duplicate center 43. The collets 91 and 92 are set to permit the carriage assembly 90 to slide across substantially the entire length of the original so that the probe 86 can contact the entire surface of the piece 60 it is desired to duplicate. When properly mounted, the axis of the work piece is parallel the axis of the template as shown in FIG. 1, and the axes of both pieces are substantially parallel the axis of the guide rail 24 along which the carriage assembly 80 moves. It is recognized that embodiments of the invention could be constructed where the arms 85 and 87 are of different lengths to produce scaled reproductions of an original, but in most instances, it is desirable to reproduce the original part in its exact size, as is the case with the illustrated embodiment. With the work piece and template thus mounted, the router 81 is turned on so that the router bit 88 is caused to turn around an axis approximately normal the axis of rotation of the work piece. The depth gauge 98 protects the work piece from too rapid a penetration by the router bit as the bit works its way into the work piece, until its further advance is checked by the probe 86 coming to rest upon the template. Because the template is turning at exactly the same speed and in the same direction as the work piece, the surface configuration of the template is exactly reproduced when the drive transmission is set as illustrated by FIG. 9. To produce a precise reverse copy of the original, the transmission is adjusted as shown in FIG. 8 so that the template turns at the same rate of speed but in a direction opposite that of the original.

It should be recognized that with the apparatus illustrated, the template which is reproduced may have extremely complex forms and thus this invention offers an easy and expedient method for reproducing complex shapes such as gun stocks.

Although this invention has been described with particular reference to certain illustrated embodiments, it is not intended thereby to limit the claims which themselves recite those details regarded as essential for the invention. It is recognized that many departures from the specific disclosure can be devised while still retaining the inventive concepts herein disclosed.

I claim:
1. A duplicator comprising:
    first chucking means including a head stock and a tail stock arranged to hold a work piece for rotation around an axis joining said head stock and said tail stock;
    second chucking means arranged to mount for rotation around a reference axis a template with a selected surface configuration, the reference axis of said template being parallel the axis of rotation of said work piece;
    a guide rail mounted parallel to said axes of rotation and extending substantially the entire work piece capacity of said first chucking means;
    a carriage assembly mounted on said guide rail to slide longitudinally along substantially its entire length and to pivot around its axis, said assembly including:
        a first arm carrying a sensing probe located to contact said template surface when said assembly is caused to pivot on said guide rail and thereby to limit the degree of pivot of said assembly in accordance with the configuration of said template's surface;
        a second arm carrying a router bit and associated drive means to spin said bit around an axis approximately normal to the axis of rotation of said work piece, said bit extending from said second arm in a direction opposite the direction that said sensing probe extends from said first arm and being located to contact said work piece at a site determined by the location of said assembly longitudinally on said guide rail and the degree of pivot of said assembly as defined by said probe; and
    means for rotating a said work piece held in said first chucking means around said axis of rotation while said router bit is caused to spin.
2. A duplicator according to claim 1 wherein said second arm carries a conventional router in position so that a bit chucked in said router constitutes said router bit carried by said arm.
3. A duplicator according to claim 2 wherein said sensing probe is configurated identical to said router bit.
4. A duplicator according to claim 1 including means for rotating said template around said reference axis at the same rate of speed as said work piece is caused to rotate.
5. A duplicator according to claim 4 wherein said means for rotating said template is adapted selectively to rotate said template in either the same or opposite direction as the direction of rotation of said work piece.
6. A duplicator according to claim 1 including means for driving said carriage assembly along said guide rail at a rate of speed correlated with the rate of rotation of said work piece.
7. A duplicator according to claim 1 wherein said head stock includes a head stock spindle carried by a head stock stand upstanding from parallel lathe ways, said tail stock includes a tail stock center carried by a tail stock stand upstanding from said lathe ways and said second chucking means includes a duplicate spindle carried by said head stock stand and a duplicate center carried by said tail stock stand.

8. A duplicator according to claim 7 wherein said tail stock stand is carried by a tail stock assembly including:
   a bearing plate slidable atop said ways;
   a shaft extending through said bearing plate and attached at its lower end to a pressure disc located adjacent the underside of said ways; and
   a handle pivotally connected to the opposite end of said shaft and including a cam surface adjacent said bearing plate so that the ways may be selectively clamped between said bearing plate and said pressure disc by operation of said handle to lift said pressure disc.

9. A duplicator according to claim 8 including rack means associated with said ways and pinion means associated with said shaft and operably associated with said rack means to move said tail stock assembly along said ways in response to rotation of said shaft.

10. A duplicator according to claim 9 wherein said rack means is located for engagement by said pinion means at a first pivoted position of said handle and for disengagement at a second pivoted position of said handle whereby to selectively permit said tail stock assembly to be manually moved across said ways.

* * * * *